Jan. 6. 1925.
V. R. RABY
CONNECTING ROD CLAMP
Filed March 28, 1923
1,522,141
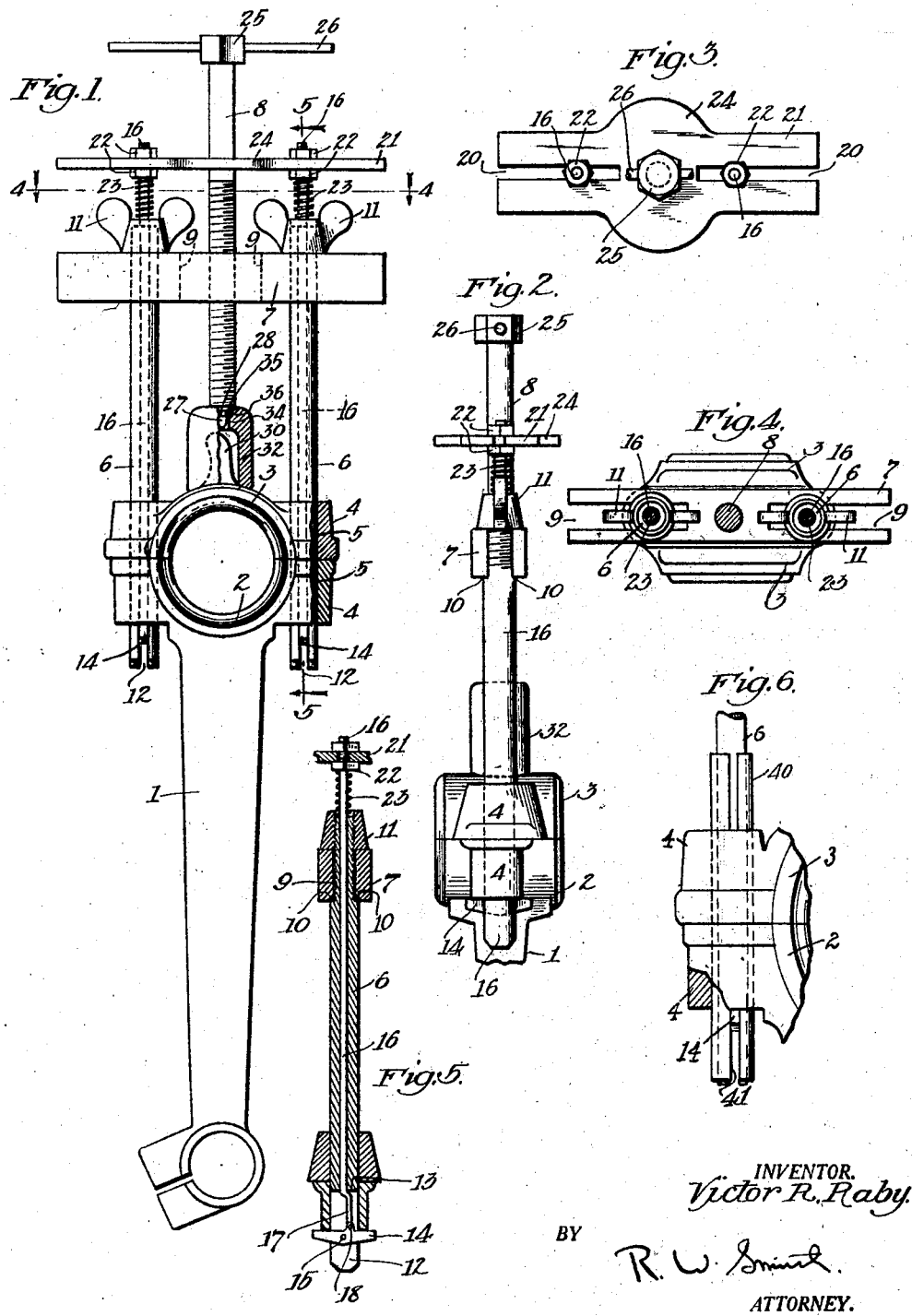
INVENTOR.
Victor R. Raby.
BY R. W. Smith.
ATTORNEY.

Patented Jan. 6, 1925.

1,522,141

UNITED STATES PATENT OFFICE.

VICTOR R. RABY, OF LOS ANGELES, CALIFORNIA.

CONNECTING-ROD CLAMP.

Application filed March 28, 1923. Serial No. 628,244.

*To all whom it may concern:*

Be it known that I, VICTOR R. RABY, a citizen of the United States, residing at Los Angeles, county of Los Angeles, State of California, have invented new and useful Improvements in Connecting-Rod Clamps, of which the following is a specification.

This invention relates to clamps particularly adapted for temporarily connecting the two halves of connecting rod bearings, the device being used when performing such operations as fitting connecting rod bearings to their crank shaft. Such an operation necessitates removing and replacing a connecting rod several times in order to properly fit the bearing; and by means of the present invention the two halves of a bearing may be conveniently and quickly clamped together and as readily separated, without bolting the two bearing halves during the fitting thereof.

It is the object of the invention to provide a tool which is adjustable to fit bearings of different sizes, and which forms a three point clamping engagement with the two parts of the bearing, in order to insure a positive clamping action.

It is a further object of the invention to provide a tool having parts thereof adapted to be received through the bolt holes of the two bearing halves, with said parts adapted to snugly fit in said holes so as to properly align the bearing halves, irrespective of variations in size of said holes.

It is a still further object of the invention to provide a tool having relatively few parts and which may be inexpensively manufactured, and which forms an extremely simple but efficient mechanism.

The invention will be readily understood from the following description of the accompanying drawings, in which:

Fig. 1 is a front elevation of the tool in operative position upon a connecting rod.

Fig. 2 is a side elevation of the same.

Fig. 3 is a top view of the tool.

Figs. 4 and 5 are sections on the lines 4—4 and 5—5 of Fig. 1.

Fig. 6 is a fragmentary elevation of one leg of the tool in operative position, and showing a bushing attachment mounted thereon.

A connecting rod upon which the tool is adapted to be used is shown at 1, said rod having a usual half-bearing 2 at the end thereof, with a separate half-bearing 3 co-operating therewith to form the bearing for the rod. The half-bearings have usual lugs 4 adapted to abut when the bearing is assembled, said lugs having bolt holes 5 for the usual bolts adapted to secure the bearing upon a crank shaft or the like.

The improved clamp for temporarily assembling bearings 2—3 without the use of such usual bolts, comprises legs 6 adapted to be received through the alined bolt holes of the half-bearings, and a cross bar 7 supporting said legs and having a clamping rod 8 threaded through the center thereof.

The ends of bar 7 are slotted as shown at 9, with the legs 6 extending through said slots so that said legs may be laterally adjusted relative to the cross-bar, in order to aline the legs with the bolt holes of bearings of different sizes.

In order to fix the legs in adjusted position relative to the cross bar, shoulders 10 are formed on said legs and are adapted to abut against the undersides of the walls of slots 9, and the legs are threaded above said shoulders so as to receive wing-nuts 11 which are adapted to clamp against the upper surfaces of the walls of slots 4.

Abutment elements are provided at the lower ends of legs 6 and are adapted to be contracted within said legs to permit the latter being inserted in bolt holes 5, said abutment elements automatically expanding when the legs are in position, so as to impinge against the undersides of the lugs 4 of half-bearing 2.

As an instance of this arrangement, legs 6 are hollow, and are slotted at their lower ends as shown at 12, in order to form shoulders 13 at the inner ends of said slots. Lugs 14 are pivoted at their centers in the slots 12, as shown at 15, said lugs when in transverse position having their ends projecting beyond the legs 6, and being adapted to be swung through slots 12 into longitudinal alinement with legs 6 so as to lie entirely within the same.

Operating rods 16 extend through the hollow legs 6, and are provided with laterally offset lower ends 17 extending into slots 12, the upper ends of the offset portions of the rods being adapted for abutment against shoulders 13, and the lower ends of said offsets being pivoted to lugs 14, eccentrically thereof as shown at 18. The parts are so arranged that when rods 16 are moved upwardly through legs 6 until the offsets 17 abut against shoulders 13, the lugs 14 are swung outwardly into operative position, and when the operating rods are moved in the opposite direction through the legs, the lugs are swung into their contracted position within the slots 12 of the legs.

The operating rods 16 are normally automatically shifted so as to expand lugs 14, and may be manually moved in the opposite direction to contract the lugs. For this purpose the upper ends of the rods extend above the ends of legs 6 and are received through slots 20 formed in the ends of a cross plate 21 positioned in spaced relation above cross bar 7. Nuts 22 are threaded on the ends of rods 16 above and below the plate 21, for abutment against the walls of slots 20, so that the operating rods are fixed against longitudinal movement relative to the cross plate, but are free for lateral adjustment along slots 20, in accordance with the lateral adjustment of legs 6 relative to cross bar 7. Coil springs 23 are mounted on rods 16 between the upper ends of legs 6 and the lower nuts 22 threaded on said rods, so that the operating rods and plate 21 are normally elevated relative to cross bar 7, in order to expand lugs 14.

Enlargements 24 are preferably provided at each side of plate 21 at the medial portion thereof, in order to form finger grips, so that by grasping cross bar 7 and pulling downwardly on plate 21, rods 16 are moved downwardly against the action of springs 23, in order to contract the lugs 14.

Clamping rod 8, which is threaded through cross bar 7 and slidably received through plate 21, is provided at its upper end with an operating head 25 having a handle bar 26, and when the tool is in operative position, the clamping rod is screwed downwardly through bar 7 so as to clamp against half-bearing 3, midway between its lugs 4.

The lower end of rod 8 is provided with a tapering head 27 of reduced diameter, and having an annular groove 28 in the upper portion thereof, and when the tool is used upon a connecting rod having its half-bearing 3 formed with no projection at the outer periphery thereof in alinement with clamping rod 8, the latter is screwed downwardly until the end of head 27 clamps against said half-bearing.

But when the tool is used upon a connecting rod having a splash cup 30 projecting from the outer periphery of its half-bearing 3 in alinement with rod 8, a cup 32 is detachably mounted on head 27 so that the rim of said cup will abut against the periphery of the half-bearing when the rod 8 is screwed downwardly to clamping position, the base of cup 32 being spaced from the splash cup 30.

In order to detachably mount cup 32 upon head 27, the base of said cup is provided with a bore 34 adapted to be received over said head, and a split-ring spring 35 is received in an annular groove 36 in said bore. When cup 32 is in position upon head 27, the spring 35 engages groove 28 formed in said head, to hold the cup in place, and when it is desired to remove cup 32, it is pulled with sufficient force to retract spring 35 within groove 36, and thereby disengage said spring from groove 28, in order to release the cup.

In using the tool, legs 6 are adjusted for alinement with the bolt holes 5 of a connecting rod, and lugs 14 are retracted so that the legs may be projected through the bolt holes, the legs being of a diameter to snugly fit in said bolt holes so as to properly aline the half-bearings 2—3.

Lugs 14 are then permitted to expand, for abutment against the underside of the lugs 4 of half-bearing 2, and rod 8 is screwed into clamping engagement against half-bearing 3. The two halves of the bearing are thus clamped by a three point engagement comprising the undersides of the lugs 4 of half-bearing 2, and the medial portion of the periphery of half-bearing 3.

When the tool is used upon a connecting rod having bolt holes 5 of greater diameter than legs 6, as shown in Fig. 6, split sleeve bushings 40 of suitable diameter to snugly fit in the bolt holes, are frictionally clamped upon the ends of legs 6, in order to properly aline the two halves of the bearing, the bushings 40 being slotted at their lower ends in alinement with slots 12, as shown at 41.

I claim:

1. A tool comprising a cross bar, legs fixed to said cross bar and having means for transversely adjusting the same relative to one another, said legs having means adapted to impinge against one side of the abutting portions of cooperating half-bearings, and clamping means adjustable relative to said cross bar and adapted to impinge against the medial portion of the periphery of the other side of said cooperating half-bearings.

2. A tool comprising legs, lugs at the ends of said legs, means for dependently contracting said lugs to permit insertion of said legs through the alined bolt holes of cooperating half-bearings, spring means for automatically expanding said lugs upon release of said contracting means so as to impinge against one side of said cooperating half-bearings, and clamping means movable relative to said legs and adapted to impinge against the other side of said cooperating half-bearings.

3. A tool comprising legs, lugs at the ends of said legs, spring means for automatically expanding said lugs so as to impinge against one side of cooperating half-bearings, and clamping means movable relative to said legs and adapted to impinge against the other side of said cooperating half-bearings.

4. A tool comprising legs, lugs at the ends of said legs, means for expanding said lugs through said legs, bushings detachably mounted on said legs, said lugs when expanded extending transversely beyond said bushings, and clamping means movable relative to said legs.

5. A tool comprising legs having means adapted to impinge against one side of the abutting portions of cooperating half-bearings, clamping means movable relative to said legs, and a cup mounted on said clamping means and adapted to be received over a projection on the opposite side of said cooperating half-bearings for impingement against said opposite side of said cooperating half-bearings.

6. A tool comprising legs, lugs pivoted to said legs, operating rods eccentrically pivoted to said pivoted lugs for swinging the latter either transversely beyond said legs or into longitudinal alinement with said legs, a transverse plate connecting said operating rods for dependently actuating the same, and clamping means movable relative to said legs.

7. A tool comprising a cross bar, legs fixed to said cross bar and having means for transversely adjusting the same relative to one another, lugs on said legs, means for dependently contracting said lugs to permit insertion of said legs through the alined bolt holes of cooperating half-bearings, means for expanding said lugs so as to impinge against one side of said cooperating half-bearings, and clamping means adjustable relative to said cross bar between said legs and adapted to impinge against the medial portion of the other side of said cooperating half-bearings.

8. A tool comprising a clamping leg, a contractible lug on said leg, a bushing detachably mounted on said leg, means for expanding said lug so as to project the latter transversely of said leg beyond said bushing, and clamping means movable relative to said leg.

9. A tool comprising legs having means adapted to impinge against one side of the abutting portions of cooperating half-bearings, a clamping bolt movable relative to said legs, said bolt having an end projection provided with an annular groove, a cup having a bore in the base thereof provided with an annular groove, said projecting end of said bolt being received in said bore for alinement of said grooves, and a locking ring in said grooves, said cup being adapted to be received over a projection on the opposite side of said cooperating half-bearings for impingement against said opposite side of said cooperating half-bearings.

10. A tool comprising a cross bar, legs fixed to said cross bar and having means for transversely adjusting the same relative to one another, a clamping bolt between said legs and adjustable through said cross bar, a transverse plate slidable on said clamping bolt, lugs pivoted to said legs, operating rods eccentrically pivoted to said pivoted lugs and connected to said transverse plate, and yieldable means between said cross bar and said transverse plate tending to shift the latter and said operating rods relative to said legs so as to swing said pivoted lugs transversely beyond said legs, the movement of said transverse plate in the opposite direction relative to said legs actuating said operating rods so as to swing said pivoted lugs into longitudinal alinement with said legs.

11. A tool comprising legs, lugs pivoted to said legs, operating rods eccentrically pivoted to said lugs for swinging the latter either transversely beyond said legs or into longitudinal alinement therewith, a transverse plate connecting said operating rods and adapted to be manually shifted in one direction for swinging said lugs into longitudinal alinement with said legs, spring means for automatically shifting said transverse plate in the opposite direction upon release of the same for swinging said lugs transversely beyond said legs, and clamping means movable relative to said legs.

12. A tool comprising a cross bar, legs fixed to said cross bar, a clamping bolt adjustable relative to said legs, a transverse plate movable longitudinally of said legs, lugs pivoted to said legs, operating rods for said pivoted lugs connected to said transverse plate, and yieldable means between said cross bar and said transverse plate tending to shift the latter and said operating rods so as to swing said pivoted lugs transversely beyond said legs, the movement of said transverse plate in the opposite direction actuating said operating rods so as to swing said pivoted lugs into longitudinal alinement with said legs.

In testimony whereof I have signed my name to this specification.

VICTOR R. RABY.